United States Patent
Otsuka et al.

(10) Patent No.: US 6,170,738 B1
(45) Date of Patent: *Jan. 9, 2001

(54) ALUMINUM BRAZING ALLOY FOR COLD BRAZING AND METHOD FOR BRAZING LOW-MELTING ALUMINUM MATERIAL

(75) Inventors: Ryotatsu Otsuka; Koji Ashida, both of Osaka (JP)

(73) Assignee: Showa Aluminum Corporation, Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/883,396

(22) Filed: Jun. 26, 1997

(30) Foreign Application Priority Data

Jun. 28, 1996 (JP) .................................... 8-169108

(51) Int. Cl.⁷ ............................. B23K 1/19; B23K 20/16; C22C 21/02
(52) U.S. Cl. ............................. 228/262.51; 228/262.51; 228/183; 420/557
(58) Field of Search .................. 420/514, 540, 420/548, 580, 557; 148/437, 441, 442; 228/262.51, 183; 428/650, 654, 658

(56) References Cited

U.S. PATENT DOCUMENTS

| | | | |
|---|---|---|---|
| 2,196,034 | 4/1940 | Schulze | 75/178 |
| 3,332,773 | 7/1967 | Dudas et al. | 75/146 |
| 3,539,308 * | 11/1970 | Nowak | 128/654 |
| 3,807,033 | 4/1974 | Schoer et al. | 29/494 |
| 3,854,935 * | 12/1974 | Snow | 75/68 |
| 3,888,660 | 6/1975 | Ebata et al. | 75/178 |
| 4,232,095 | 11/1980 | Pirner et al. | 428/654 |
| 4,527,184 | 7/1985 | Fischer | 357/67 |
| 4,650,528 | 3/1987 | Masumoto et al. | 148/437 |
| 4,861,681 | 8/1989 | Asano et al. | 428/654 |
| 4,901,908 | 2/1990 | Negura et al. | 228/183 |
| 4,999,160 * | 3/1991 | Lowrey et al. | 420/529 |
| 5,055,256 | 10/1991 | Sigworth et al. | 420/548 |
| 5,316,206 | 5/1994 | Syslak et al. | 228/183 |
| 5,375,760 * | 12/1994 | Doko | 228/183 |
| 5,447,683 * | 9/1995 | Montgomery et al. | 420/117 |
| 5,820,698 | 10/1998 | Tohma et al. | 148/24 |
| 5,906,897 | 5/1999 | Tanaka et al. | 428/627 |
| 5,907,761 * | 5/1999 | Tohma et al. | 428/553 |

FOREIGN PATENT DOCUMENTS

| | | |
|---|---|---|
| 1 934 788 | 1/1971 | (DE) . |
| 3 032 153 A1 | 3/1981 | (DE) . |
| 0 661 130 A1 | 7/1995 | (EP) . |
| 52-43175 | 10/1977 | (JP) .................................... 420/557 |
| 03230889 | 10/1991 | (JP) . |
| 03294082 | 12/1991 | (JP) . |
| 04187370 | 7/1992 | (JP) . |
| 04294890 | 10/1992 | (JP) . |
| 05318172 | 12/1993 | (JP) . |
| 08047795 | 2/1996 | (JP) . |

OTHER PUBLICATIONS

Chemical Abstracts, vol. 98, No. 16, Apr. 18, 1983, Abstract No. 130495, XP002043304.

* cited by examiner

Primary Examiner—Patrick Ryan
Assistant Examiner—L. R. Edmondson

(57) ABSTRACT

A first aluminum brazing alloy for cold brazing, comprises 70 to 90% by weight of zinc and 0.05 to 5% by weight of titanium with the balance consisting of aluminum and impurities. A second aluminum brazing alloy for cold brazing, comprises 30 to 70% by weight of zinc, 1 to 7% by weight of silicon, and 0.05 to 5% by weight of titanium with the balance consisting of aluminum and impurities. Brazing alloys having these compositions have a low melting point and can well wet a base metal. Further, use of the above aluminum brazing alloy for cold brazing enables a low-melting aluminum material to be well brazed at 400 to 550° C.

4 Claims, 1 Drawing Sheet

ALUMINUM BRAZING ALLOY FOR COLD BRAZING AND METHOD FOR BRAZING LOW-MELTING ALUMINUM MATERIAL

TECHNICAL FIELD OF THE INVENTION

This invention relates to an aluminum brazing alloy, for cold brazing, used in brazing of low-melting aluminum materials, such as aluminum cast materials and die-cast materials, and a method for brazing these low-melting aluminum materials.

The term "aluminum" used herein is intended to mean not only aluminum but also aluminum alloys.

RELATED ART

Aluminum cast materials, such as AC2B and AC4C, and aluminum die-cast materials, such as ADC10 and ADC12, have a low melting point. Therefore, in brazing these materials, a brazing material made of an aluminum-zinc-base brazing alloy which has a melting point below an aluminum-silicon-base brazing alloy and enables brazing at a temperature of 550° C. or below is used.

The aluminum-zinc-base brazing alloy, however, has a high zinc content from the viewpoint of ensuring the low melting point, posing a problem that it is difficult to wet the base metal resulting in poor brazeability.

DISCLOSURE OF THE INVENTION

An object of the present invention is to solve the above problems and to provide an aluminum brazing alloy, for cold brazing, having a low melting point and possessing a good wetting property and a method for brazing a low-melting aluminum material.

In order to attain the above object, the aluminum-zinctitanium-base, first aluminum brazing alloy for cold brazing according to the present invention is characterized by comprising 70 to 90% by weight of zinc and 0.05 to 5; by weight of titanium with the balance consisting of aluminum and impurities. The aluminum-zinc-silicon-titanium-base, second aluminum brazing alloy for cold brazing according to the present invention is characterized by comprising 30 to 70% by weight of zinc, 1 to 7% by weight of silicon, and 0.05 to 5% by weight of titanium with the balance consisting of aluminum and impurities.

In the first and second aluminum brazing alloys for cold brazing according to the present invention, zinc permits the brazing alloy to melt at 380 to 560° C. enabling brazing at 400 to 550° C. When the zinc content of the brazing alloy is below 30% by weight, the melting point of the brazing alloy cannot be decreased to such an extent that brazing can be conducted at 550° C. or below. On the other hand, when it exceeds 90% by weight, the melting point of the brazing alloy becomes excessively low. In particular, when the melting point of the brazing alloy is excessively low, the brazing alloy cannot be used in flux brazing because at the present time there is no low-melting flux. Therefore, brazing methods usable in this case are limited, resulting in decreased versatility of the brazing alloy. For this reason, the zinc content should be 30 to 90% by weight. The lower limit of the content of zinc in the first aluminum-zinc-titanium-base brazing alloy is 70% by weight because, when the zinc content is less than 70% by weight, the melting point becomes excessively high, making it necessary to regulate the melting point by the addition of silicon which will be described below in detail. Similarly, the upper limit of the content of zinc in the second aluminumzinc-silicon-titanium-base brazing alloy is 70% by weight because, as will be described below in detail, only a zinc content of not more than 70% by weight, in combination with the addition of silicon, can improve the brazing capability. Therefore, in the first brazing alloy, the zinc content should be 70 to 90% by weight with the lower and upper limits of the zinc content being preferably 80% by weight and 89% by weight, respectively. In the second brazing alloy, the zinc content should be 30 to 70% by weight with the lower and upper limits of the zinc content being preferably 31% by weight and 69% by weight, respectively.

Titanium is added in order to improve the wetting property of the brazing alloy. When the titanium content is less than 0.05% by weight, the above effect is unsatisfactory, while when it exceeds 5; by weight, the melting point of the brazing alloy is unfavorably increased. The effect of improving the wetting property is significant when the material to be brazed is a cast material or a die-cast material. For the above reason, the titanium content should be 0.05 to 5% by weight. The lower limit of the titanium content is preferably 0.1% by weight with the upper limit being preferably 2% by weight. Further, titanium, when used in combination with about 30 to 40% by weight of zinc, can improve the wetting property and, at the same time, can inhibit the creation of a shrinkage cavity and a crack.

Silicon added in the second aluminum brazing alloy for cold brazing has the effect of regulating the melting point of the brazing alloy and, in addition, narrowing the melting temperature range. When the melting temperature range, that is, the difference in temperature between the solidus line and the liquidus line, is large, the creation of a shrinkage cavity is increased at the time of solidification, resulting in deteriorated air tightness of the brazed portion. The above contemplated effect can be attained when the zinc content is 30 to 70% by weight. When the silicon content is less than 1% by weight, the above effect is unsatisfactory. On the other hand, a silicon content exceeding 7% by weight results in saturation of the above effect and, in addition, disadvantageously leads to deteriorated workability. For the above reason, the silicon content should be 1 to 7% by weight with the lower and upper limits of the silicon content being preferably 3% by weight and 5% by weight, respectively.

Thus, the first aluminum brazing alloy for cold brazing according to the present invention comprises 70 to 90% by weight of zinc and 0.05 to 5% by weight of titanium with the balance consisting of aluminum and impurities and, hence, melts at 380 to 520° C. and can well wet the base metal. This realizes brazing at a low temperature of 400 to 500° C. and, when applied to brazing of low-melting cast materials and die-cast materials, can prepare high-quality brazed products having neither a shrinkage cavity nor a crack. The second brazing alloy comprises 30 to 70% by weight of zinc, 1 to 7% by weight of silicon, and 0.05 to 5% by weight of titanium with the balance consisting of aluminum and impurities and, hence, can realize good brazing at a temperature of 500 to 550° C. and can offer the same effects as the first brazing alloy.

According to the method for brazing a low-melting aluminum material according to the present invention, brazing is conducted using the above aluminum-zinc-titanium-base or aluminum-zinc-silicon-titanium-base aluminum brazing alloy for cold brazing, and, in this case, the heating temperature is 400 to 550° C.

The term "low-melting aluminum material" used herein is intended to mean an aluminum material which, due to its melting point, should be brazed at 550° C. or below, and examples thereof include various cast materials and die-cast materials. This brazing method may also be applied when at least one of joining materials is such a low-melting aluminum material. That is, the brazing method is applicable when the counter material for brazing is a low-melting aluminum material having the same composition, a low-melting aluminum material having a different composition, an aluminum material having a melting point above the melting point of a cast material or the like, such as a wrought product, or a dissimilar metallic material other than aluminum.

As described above, the brazing alloy used in this brazing method has an improved wetting property, by virtue of the addition of titanium, despite the fact that a large amount of zinc is contained from the viewpoint of ensuring a low melting point. Therefore, use of the above brazing alloy can realize good brazing of a low-melting aluminum alloy, enabling the preparation of high-quality brazed products having neither a shrinkage cavity nor a crack. Better brazing can be achieved when the heating temperature is 400 to 500° C. in the case of using the aluminum-zinc-titanium-base, aluminum brazing alloy for cold brazing and 500 to 550° C. in the case of using the aluminum-zinc-silicon-titanium-base, aluminum brazing alloy for cold brazing.

DESCRIPTION OF PREFERRED EMBODIMENTS

Figure 1:
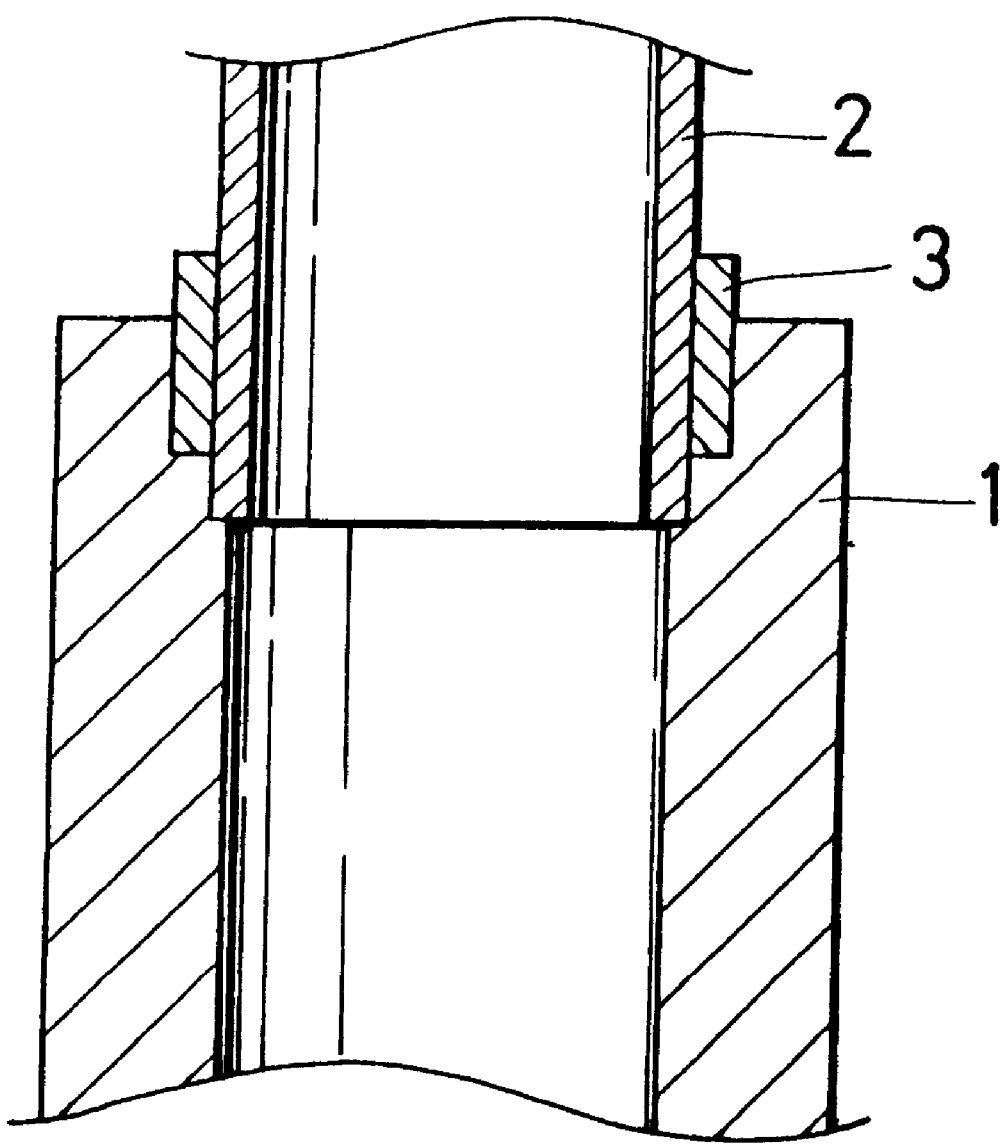
FIG. 1 is a vertical sectional view showing brazing of a lap joint in a brazing test for the aluminum brazing alloy for cold brazing according to the present invention.

Embodiments of the aluminum brazing alloy for cold brazing and the brazing method according to the present invention will be described.

Aluminum brazing alloys respectively having compositions specified in Table 1 given below were prepared. On the other hand, a pipe material 1, constructed of a cast material or a die-cast material, with a larger diameter section provided on the internal circumference of one end section thereof and an extruded pipe 2 made of JIS A6063, as shown in FIG. 1, were provided as base metals for a brazing test. The pipe material 1 was made of JIS ADC10 for Examples 1 to 3 and Comparative Example 10 and JIS AC4C for Examples 4 to 8 and Comparative Example 9.

Brazing was conducted as shown in FIG. 1. Specifically, the lower end section of the extruded pipe 2 was fitted into the larger diameter section provided in the upper end of the pipe material 1 to assemble a lap joint. A brazing alloy 3, which had been formed into a ring, was put on the upper end of the larger diameter section. Thereafter, a low-melting CsAlF$_3$ flux suspension in the case of Examples 1 to 3 and Comparative Example 10 and a chloride flux suspension in the case of Examples 4 to 8 and Comparative Example 9 were applied, and the coating was then dried. The joints were then heated in a nitrogen gas atmosphere respectively at temperatures specified in Table 1 to conduct brazing.

The brazed products were inspected and evaluated for wetting property, shrinkage cavity, and cracking according to the following criteria. The evaluation results are also summarized in Table 1.

(Wetting property)

◎: Wetting of cast material or die-cast material was very good.

○: Wetting of cast material ordie-cast material was good.

Δ: Wetting of cast material or die-cast material was not very good.

×: Cast material or die-cast material was not wetted at all.

(Shrinkage cavity)

○: Creation of no shrinkage cavity

Δ: Creation of some shrinkage cavity

×: Creation of many shrinkage cavities (Cracking)

○: Not cracked

×: Cracked

The evaluation results are also summarized in Table 1.

TABLE 1

| | | Composition of brazing alloy (wt %) | | | | Brazing temp. | Evaluation | | |
|---|---|---|---|---|---|---|---|---|---|
| No. | | Al | Zn | Si | Ti | (° C.) | Wetting | Shrinkage cavity | Cracking |
| Ex. | 1 | 20 | Balance | — | 1 | 470 | ◎ | Δ | ○ |
| | 2 | 15 | Balance | — | 1.5 | 450 | ◎ | ○ | ○ |
| | 3 | 10 | Balance | — | 2 | 430 | ◎ | ○ | ○ |
| | 4 | Balance | 40 | 3 | 0.2 | 550 | ◎ | ○ | ○ |
| | 5 | Balance | 35 | 4 | 0.2 | 550 | ◎ | ○ | ○ |
| | 6 | Balance | 30 | 5 | 0.2 | 550 | ◎ | ○ | ○ |
| | 7 | Balance | 30 | 5 | 0.08 | 550 | ○ | ○ | ○ |
| | 8 | Balance | 30 | 5 | 4 | 550 | ○ | ○ | ○ |
| Comp. Ex. | 9 | Balance | 35 | 4 | — | 550 | Δ | × | × |
| | 10 | 10 | Balance | — | — | 430 | × | ○ | ○ |

Ex. . . . Example
Comp. . . . Comparative
temp. . . . temperature

As is apparent from the results given in table 1, the brazing alloys of the examples according to the present invention could well wetted the base metal even at a temperature of 550° C. or below and realized good brazing free from creation of a shrinkage cavity and a crack.

It should be noted that the terms and expressions used herein are illustrative only, are not intended to limit the scope of the invention and does not exclude any equivalent of features indicated and described herein and that various modifications and variations falling within the scope of claims of the invention are tolerated.

What is claimed is:

1. A method for brazing a low-melting aluminum material, characterized in that an aluminum brazing alloy for cold brazing consisting of 70 to 90% by weight of zinc and 0.05 to 5; by weight of titanium with the balance comprising aluminum and impurities is used and heating is conducted at 400 to 550° C.

2. The method for brazing a low-melting aluminum material as recited in claim 1, wherein the heating temperature is 400 to 500° C.

3. A method for brazing a low-melting aluminum material, characterized in that an aluminum brazing alloy for cold brazing consisting of 30 to 70% by weight of zinc, 1 to 7% by weight of silicon, and 0.05 to 5% by weight of titanium with the balance comprising aluminum and impurities is used and heating is conducted at 400 to 550° C.

4. The method for brazing a low-melting aluminum material as recited in claim 3, wherein the heating temperature is 500 to 550° C.

* * * * *

UNITED STATES PATENT AND TRADEMARK OFFICE
CERTIFICATE OF CORRECTION

PATENT NO. : 6,170,738 B1  Page 1 of 1
DATED : January 9, 2001
INVENTOR(S) : Otsuka et al.

It is certified that error appears in the above-identified patent and that said Letters Patent is hereby corrected as shown below:

Claim 1,
Line 4, delete "5;" and insert -- 5% --
Line 3, delete "consisting of" and insert -- comprising --
Line 4, delete "comprising" and insert -- consisting of --

Claim 3,
Line 3, delete "consisting of" and insert -- comprising --
Line 5, delete "comprising" and insert -- consisting of --

Signed and Sealed this

Fifth Day of February, 2002

Attest:

JAMES E. ROGAN
Attesting Officer  *Director of the United States Patent and Trademark Office*